Feb. 4, 1930. W. R. JOHNSTON 1,746,118
DIRIGIBLE DRIVING LIGHT
Filed Sept. 29, 1927 2 Sheets-Sheet 1
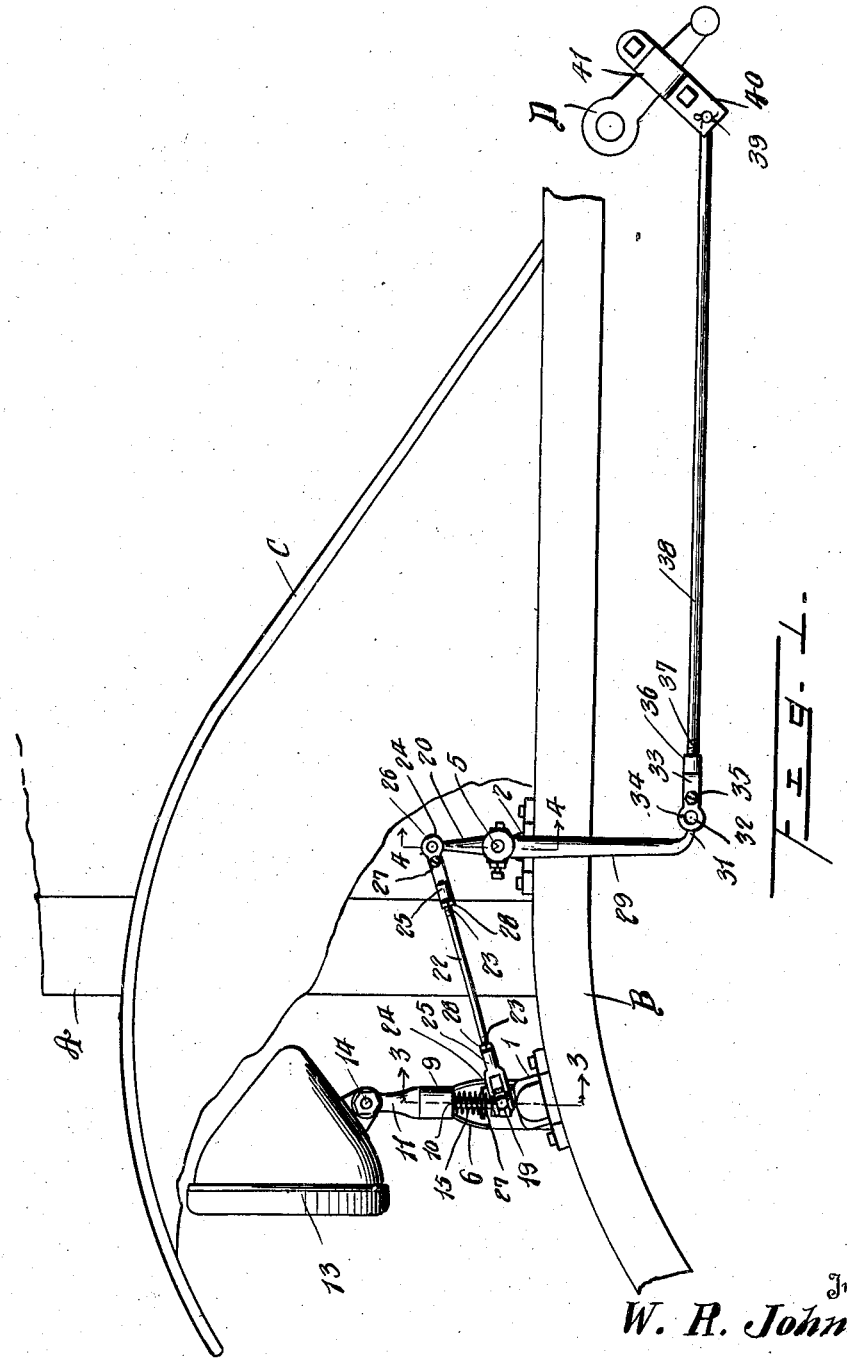
Inventor
W. R. Johnston,
By
Attorney Feb. 4, 1930.  W. R. JOHNSTON  1,746,118
DIRIGIBLE DRIVING LIGHT
Filed Sept. 29, 1927  2 Sheets-Sheet 2
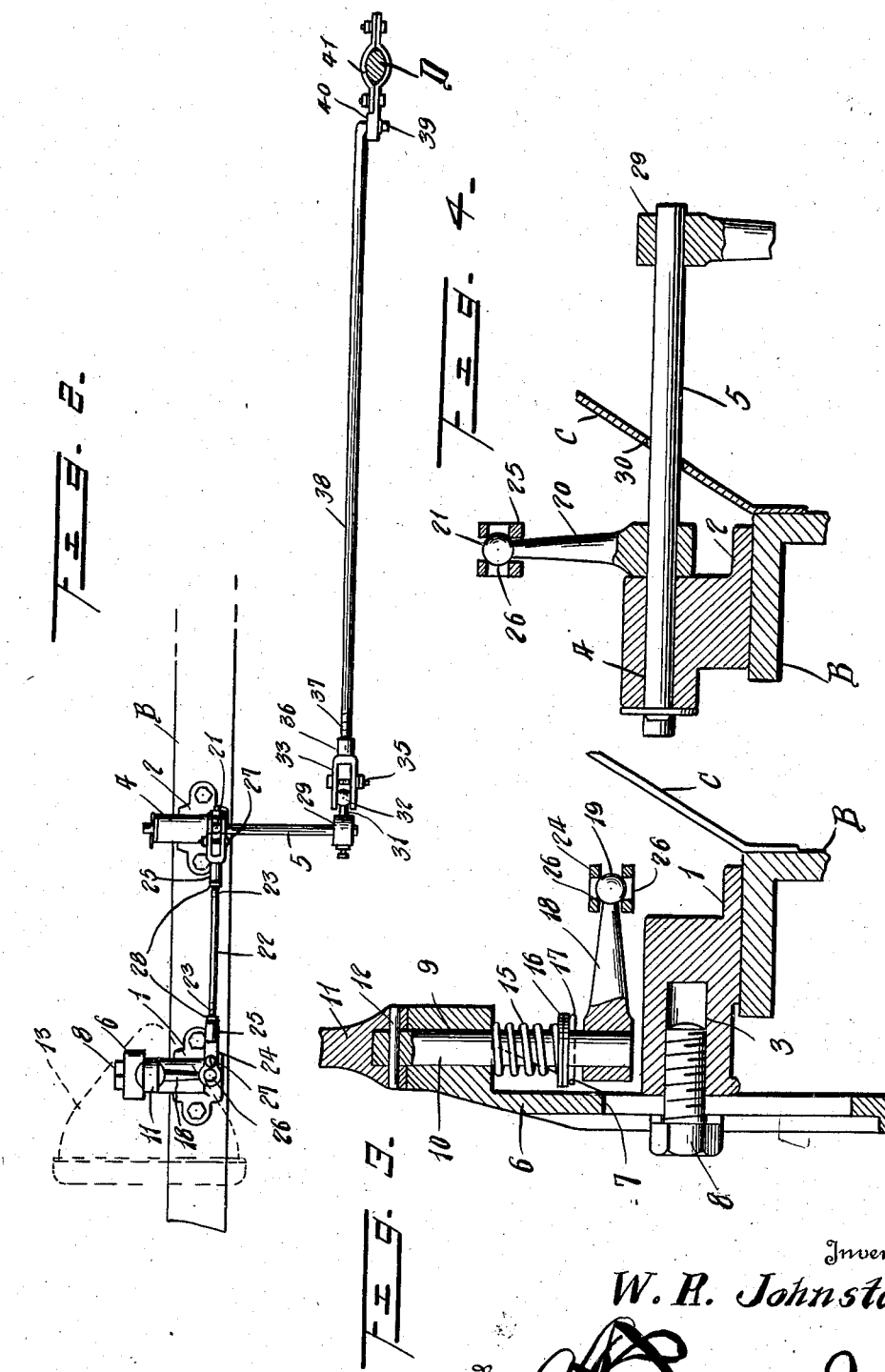
Inventor
W. R. Johnston,
By
Attorney Patented Feb. 4, 1930

1,746,118

UNITED STATES PATENT OFFICE

WILLIAM R. JOHNSTON, OF OMAHA, NEBRASKA, ASSIGNOR TO THE PERFECTION DRIVING LIGHT CO., OF OMAHA, NEBRASKA, A CORPORATION OF NEBRASKA

DIRIGIBLE DRIVING LIGHT

Application filed September 29, 1927. Serial No. 222,842.

The invention relates to driving lights for motor vehicles and has for its object the provision of an automobile accessory comprising a lamp that is adapted to be mounted on the frame of the automobile and connected with the rocker arm of the steering mechanism to move the lamp on a vertical axis so that the rays of light therefrom will be thrown in the direction in which the automobile may be proceeding in rounding curves as well as straight away driving.

A further object of the invention is the provision of a driving light that is adapted to be used as an accessory for automobiles generally, being adaptable to different types of automobiles.

A further object of the invention is the provision of an accessory of the character stated comprising brackets adapted to be mounted on the frame of an automobile, one of said brackets having a threaded socket to receive a screw member to hold a standard in an adjusted position relatively to the frame, said standard having a bearing for the lamp shaft, the other bracket having a bearing for a horizontal shaft that is extensible through an opening in the adjacent wheel fender, the lamp shaft and the horizontal shaft having arms connected by adjustable links, and the horizontal shaft also having an arm secured thereto that is connectible with the rocker shaft of the vehicle, said construction providing for moving the lamp shaft so that the rays of light from the lamp will at all times be thrown directly in front of the automobile.

The invention will be described in detail hereinafter and will be found illustrated in the accompanying drawings in which Figure 1 is a side view of a fragment of an automobile showing the dirigible driving light applied thereto, Figure 2 is a top plan view of the driving light, Figure 3 is a sectional detail on a plane indicated by the line 3—3 of Figure 1, and Figure 4 is a sectional detail on a plane indicated by the line 4—4 of Figure 1.

In the drawings similar reference characters are used to designate corresponding parts throughout the several views.

The improved driving light is shown applied to a motor vehicle suggested at A having a side sill B and a wheel fender C. The accessory comprises two brackets designated and 2 that are adapted to be secured to the side sill B, the bracket 1 being provided with a threaded socket 3, while the bracket 2 is provided with a bearing 4 in which is journaled in a horizontal shaft 5. Supported on the bracket 1 is a standard 6, having longitudinal slots 7 through which is secured a set bolt 8 engaging in the threaded socket 3, this structure providing for adjusting the standard up and down or at an angle to the vertical as may be desired by the operator. Standard 6 is provided with a bearing 9 in which is journaled a lamp shaft 10 that is connected to the lamp post 11 by means of a pin 12, 13 designating a lamp that is secured to the lamp post 11 in the ordinary manner as suggested at 14. 15 indicates a cushion spring enclosing shaft 10 and bearing against the lower end of the bearing 9 and the disk 16 connected to the shaft 10 by means of a pin or other member 17.

Secured for rotation with the shaft 10 is an arm 18 having a ball end 19. Secured to the horizontal shaft 5 is an arm 20 having a ball end 21. 22 indicates a rod or link for connecting the arms 18 and 20, said rod or link having its ends threaded as shown at 23 to which is secured bifurcated clips 24 by means of threaded sockets 25 engaging said threaded ends, the arms of said clips 24 having their ends enlarged and provided with recesses or openings 26 to receive the ball end 19 or 21, as the case may be. This structure of joint between the clips 24 and the balls 19 or 21 provides a limited universal movement between the clips and the balls to permit the rod or link 22 to adjust itself automatically in operation. The bifurcated clips 24 are provided with clamping screws 27 to hold the arms of the clips in engagement with the balls 19 or 21. 28 designates jamb nuts mounted on the threaded ends of the rod 22 back of the threaded sockets 25 to hold the rod 22 in adjusted positions in the sockets. 29 designates an arm secured to the shaft 5 adjacent to its outer extremity, said shaft being passed through an opening 30 in the apron of the wheel fender C, and said arm is provided with an angular extension 31 having a ball end 32 that is engageable by a bifurcated clip 33 that is similar in construction to the clip 24, having an opening or recess 34 to receive the ball end 32 and a clamp screw 35 to hold the arms of the clip 33 in engagement with the ball. Clip 33 has a threaded socket 36 to receive the threaded end 37 of a rod 38, said rod having its other end provided with an angular extension 39 that engages one member 40 of a clamp 41 that is adapted to be secured to the rocker arm D of the motor vehicle.

In operation it will be apparent that as the rocker arm B is moved backward or forward in steering the motor vehicle movement of the lamp will be imparted through the shaft 5 by means of the rod 38 connected to the arm 29, and through the rod 22 connected with the arm 20 and arm 17 secured to the lamp shaft 10 to the lamp post 11 so that the lamp will be turned on a vertical axis and the rays of the light therefrom will be thrown in front of the vehicle at all times whether driving straight ahead or making right or left turns to illuminate the road around the curves.

What is claimed is:—

In a driving light, a bracket adapted for attachment to the frame of a vehicle with one end projecting laterally beyond such frame; a standard abutting the outer end of the bracket and adjustable about a horizontal axis and fastened to said bracket, said standard at its upper end having a thickened portion forming a bearing integral therewith projecting laterally therefrom and overhanging said bracket in spaced relation thereto, a lamp shaft journaled in said bearing and extending into the space between said bracket and said bearing, and means for dirigible operation connected to the shaft in said space.

In testimony whereof I affix my signature.

WILLIAM R. JOHNSTON.